(12) United States Patent
Hsiao et al.

(10) Patent No.: US 10,114,164 B2
(45) Date of Patent: Oct. 30, 2018

(54) EDGE-TYPE BACKLIGHT SOURCE ASSEMBLIES AND BACK MODULES

(71) Applicant: Shenzhen China Star Optoelectronics Technology Co., Ltd., Shenzhen, Guangdong (CN)

(72) Inventors: Yuchun Hsiao, Guangdong (CN); Guofu Tang, Guangdong (CN); Quan Li, Guangdong (CN); Gang Yu, Guangdong (CN); Taiyong Yin, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 285 days.

(21) Appl. No.: 14/904,162

(22) PCT Filed: Dec. 25, 2015

(86) PCT No.: PCT/CN2015/098859
§ 371 (c)(1),
(2) Date: Jan. 11, 2016

(87) PCT Pub. No.: WO2017/063284
PCT Pub. Date: Apr. 20, 2017

(65) Prior Publication Data
US 2017/0254942 A1    Sep. 7, 2017

(30) Foreign Application Priority Data

Oct. 13, 2015    (CN) .......................... 2015 1 0671151

(51) Int. Cl.
*G02B 6/00*    (2006.01)
*F21V 8/00*    (2006.01)

(52) U.S. Cl.
CPC .......... *G02B 6/0023* (2013.01); *G02B 6/009* (2013.01); *G02B 6/0068* (2013.01); *G02B 6/0073* (2013.01); *G02B 6/0083* (2013.01)

(58) Field of Classification Search
CPC .... G02B 6/009; G02B 6/0023; G02B 6/0026; G02B 6/0031; G02B 6/0068; G02B 6/0073; G02B 6/0086
(Continued)

(56) References Cited

U.S. PATENT DOCUMENTS

2013/0114299 A1    5/2013 Lee

FOREIGN PATENT DOCUMENTS

CN    102656401 A    9/2012
CN    103375739 A    10/2013
(Continued)

*Primary Examiner* — Andrew Coughlin
*Assistant Examiner* — Meghan Ulanday
(74) *Attorney, Agent, or Firm* — Andrew C. Cheng

(57) ABSTRACT

An edge-type backlight source assembly includes at least one quantum bar (QD) tube bracket, at least one QD tube fixed within the QD tube bracket, a plurality of LED lamp bars, and a connector. The LED lamp bar includes a substrate and a plurality of LED lamps on the substrate, and the LED lamps emit blue light. The substrate is attached to a bottom of the QD tube bracket. The LED lamps are received within the QD tube bracket and are arranged to be opposite to the QD tube. The connector electrically connects with the adjacent two LED lamp bars and is fixed on a sidewall of the QD tube bracket. A backlight module is also disclosed. The connector, which is fixed on the sidewall of the QD tube bracket, electrically connects to the two adjacent LED lamps to ensure the wiring connection between the lamp bars.

17 Claims, 3 Drawing Sheets

(58) Field of Classification Search
USPC .......................................... 362/608, 609, 612
See application file for complete search history.

(56) References Cited

FOREIGN PATENT DOCUMENTS

| | | |
|---|---|---|
| CN | 103375772 A | 10/2013 |
| CN | 103885226 A | 6/2014 |
| CN | 105182608 A | 12/2015 |

EDGE-TYPE BACKLIGHT SOURCE ASSEMBLIES AND BACK MODULES

BACKGROUND OF THE INVENTION

1. Field of the Invention

The present disclosure relates to liquid crystal display technology, and more particularly to an edge-type backlight source assembly and a backlight module.

2. Discussion of the Related Art

With respect to conventional white light LED backlight, the light-emitting principle of blue LEDs activate yellow phosphor. The color saturation value of NTSC (National Television Standards Committee, which is a television standard) is in a range between 60% and 80%.

Quantum dots are nano-material composed of dozens of atoms. Three dimensions of the quantum dots are less than 100 nanometers in size. The quantum dot composed by different material may have different wavelengths. Since 1990s, these materials have been used in the light-emitting diode, or monochromatic light source device to replace the traditional fluorescent until after 2000. Scientists began to explore the possibility of its use on the display. In recent years, quantum dots are adopted by liquid crystal displays to resolve technical issues of color performance, and thus have attracted businesses attentions. In order to enhance the NTSC value, currently, one solution relates to a LED for excitation of nanoscale quantum dots. By adopting quantum effects, NTSC value may be over 100%, and thus the display performance may be enhanced.

Currently, quantum dots technology relates to encapsulating quantum dots (QDs) in quantum tubes to protect the quantum dots. The fixation of the QD tube is the current issue. Mainly, the QD tube is fixed through the bracket. However, a length of the QD tube is often very long, the matched LED lights are often short, and thus a plurality of LED light bars have to be electrically connected. Wire connections may be easily loose and may surely increase the wiring complexity and increase the volume of the bracket. Thus, the dimension of the backlight module and the display device may be affected. Therefore, it is important about how to ensure the reliability of the fixed QD tube while reducing the size of the backlight module.

SUMMARY

In order to overcome the above problems, a small-sized edge-type backlight source assembly and a backlight module incorporated with quantum tube are proposed.

In one aspect, an edge-type backlight source assembly includes: at least one quantum bar (QD) tube bracket, at least one QD tube fixed within the QD tube bracket, a plurality of LED lamp bars, and a connector, the LED lamp bar includes a substrate and a plurality of LED lamps on the substrate, the LED lamps emit blue light, the substrate is attached to a bottom of the QD tube bracket, the LED lamps are received within the QD tube bracket and are arranged to be opposite to the QD tube, the connector electrically connects with the adjacent two LED lamp bars and is fixed on a sidewall of the QD tube bracket.

Wherein the QD tube bracket includes a plurality of sub-brackets assembled along a length direction.

Wherein each of the sub-brackets includes a first side plate and a second side plate spaced apart from each other, and a plurality of spacing bars spaced apart from each other, the spacing bars connect between the first side plate and the second side plate, a stopper protrusion is configured on internal walls of the first side plate and the second side plate, and the QD tube is clasped between the spacing bar and the stopper protrusion.

Wherein a surface of the stopper protrusion faces toward the QD tube is arc-shaped.

Wherein, for each of the two adjacent sub-brackets, an outer surface of an end portion of the second side plate recesses to form a step portion, and the connector is arranged within a space defined by two adjacent step portions.

Wherein the second side plate is higher than the first side plate.

Wherein the welding foots of the connector face toward the LED lamps, and the welding foots electrically connect with two adjacent LED lamp bars.

Wherein the end portion of the second side plate, which is close to the bottom, includes a notch for the welding foot to pass through.

Wherein a shade block is configured to attach to a jointing portion of two adjacent sub-brackets when the connector is not arranged in the jointing portion of the two adjacent sub-brackets.

In another aspect, a backlight module includes a light guiding plate and the above edge-type backlight source assembly, and the QD tube is arranged in a light-incident side of the light guiding plate.

In view of the above, the QD tube bracket fixes the QD tube. The bases of the LED lamp bars attached to the bottom of the QD tube bracket such that the LED lamps are received within the QD tube bracket, and the LED lamps face toward the QD tubes. The connector, which is fixed on the sidewall of the QD tube bracket, electrically connects to the two adjacent LED lamps to ensure the wiring connection between the lamp bars. The wiring complexity is reduced, and thus may be easily implemented. The dimension of the QD tube bracket is decreased. This configuration realizes a compact backlight source assembly, the backlight module, the display device.

DETAILED DESCRIPTION OF THE EMBODIMENTS

Embodiments of the invention will now be described more fully hereinafter with reference to the accompanying drawings, in which embodiments of the invention are shown.

Figure 1:
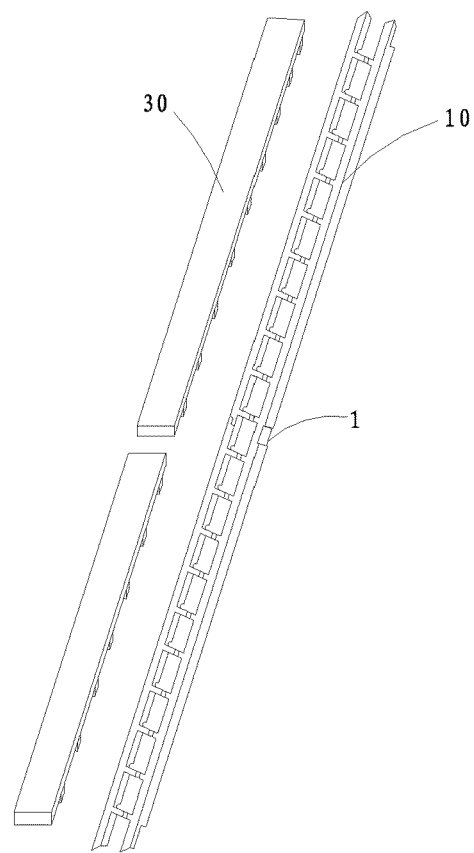
FIG. 1 is a schematic view of the backlight source assembly in accordance with one embodiment.
Figure 2:
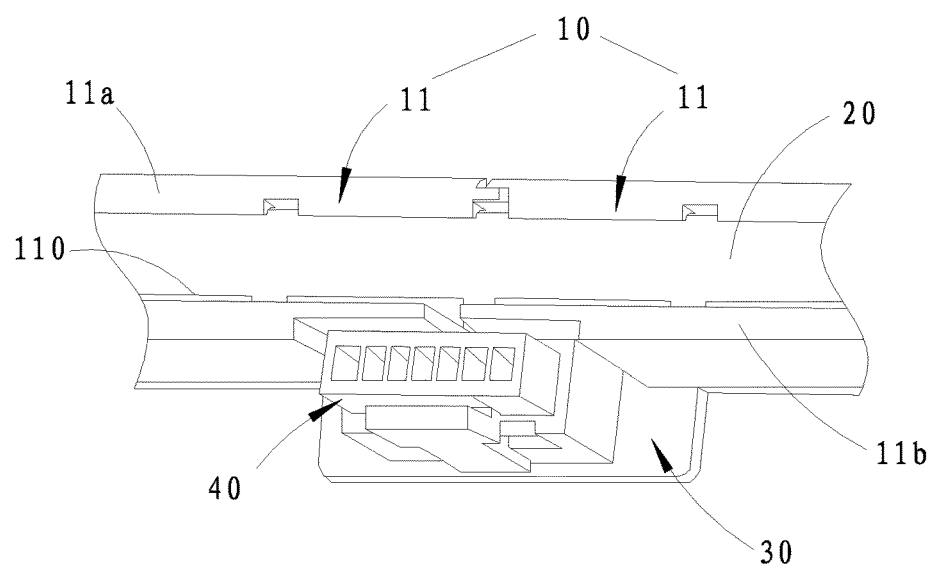
FIG. 2 is a partial schematic view of the backlight source assembly in accordance with one embodiment.

Referring to FIGS. 1 and 2, the edge-type backlight source assembly includes at least one QD tube bracket 10, at least one QD tube 20 fixed within the QD tube bracket 10, a plurality of LED lamp bars 30, and a connector 40. The LED lamp bar 30 includes a substrate 30 and a plurality of LED lamps on the substrate, and the LED lamps emit blue light. The substrate is attached to a bottom of the QD tube bracket 10. The LED lamps are received within the QD tube bracket 10 and are arranged to be opposite to the QD tube 20. The connector 40 electrically connects with the adjacent two LED lamp bars 30 and is fixed on a sidewall of the QD tube bracket 10.

Figure 3:
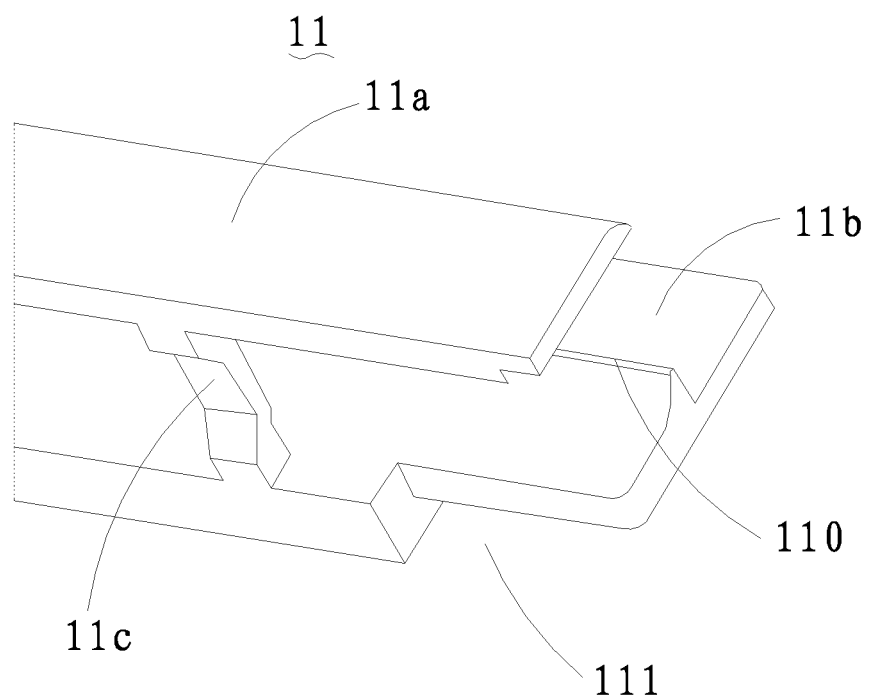
FIG. 3 is a partial schematic view of the sub-fixing bracket in accordance with one embodiment.

Referring to FIG. 3, the QD tube bracket 10 includes a plurality of sub-brackets 11 assembled along a length direction. Each of the sub-brackets 11 includes a first side plate 11a and a second side plate 11b spaced apart from each other, and a plurality of spacing bars 11c spaced apart from each other. The spacing bars connect between the first side plate 11a and the second side plate 11b. The spacing bars 11c connects to the bottom of the sub-bracket 11. At the same time, the LED lamps are respectively received in an independent space defined by corresponding spacing bars 11c. The QD tube 20 are supported by a top surface of the spacing bar 11c.

In order to limit the location of the QD tube 20, a stopper protrusion 110 is configured in a central location of internal walls of the first side plate 11a and the second side plate 11b. The QD tube 20 is clasped between the spacing bar 11c and the stopper protrusion 110. The surface of the stopper protrusion 110 faces toward the QD tube 20 is arc-shaped, and thus may engage with an outer surface of the QD tube 20. In this way, the stopper protrusion 110 may closely contact with the QD tube 20 to increase the contact dimension therebetween. Thus, the QD tube 20 may be well protected.

Figure 4:
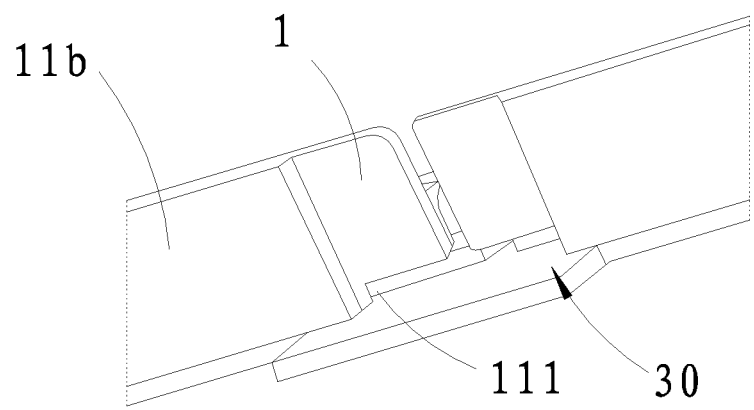
FIG. 4 is a schematic view of the jointing portion of the fixing bracket of the quantum tube in accordance with one embodiment.

Referring to FIG. 4, for each of the two adjacent sub-brackets 11, the outer surface of the end portion of the second side plate 11b recesses to form a step portion 1. The connector 40 is arranged within a groove defined by two adjacent step portions 1. In this way, a portion of the connector 40 or the whole body of the connector 40 is embedded within the sub-bracket 11 such that the overall width of the QD tube bracket 10 is small, which results in a more compact edge-type backlight source assembly.

The second side plate 11b is higher than the first side plate 11a. The stopper protrusion 110 protrudes to be at the same altitude with a top of the first side plate 11a and with a central portion of the second side plate 11b. The height of the second side plate 11b is the same with the height of the connector 40. In order to decrease the wiring length of the connector and to decrease the space occupied by the wiring, the welding foot of the connector 40 faces toward the LED lamps, and the welding foot electrically connects with two adjacent LED lamp bars 30. Further, the end portion of the second side plate 11b, which is close to the bottom, includes a notch 111 for the welding foot of the connector 40 to pass through, which avoids the interference between the welding foot and the QD tube bracket 10. At the same time, this configuration may decrease the height of the sub-bracket 11.

Figure 5:
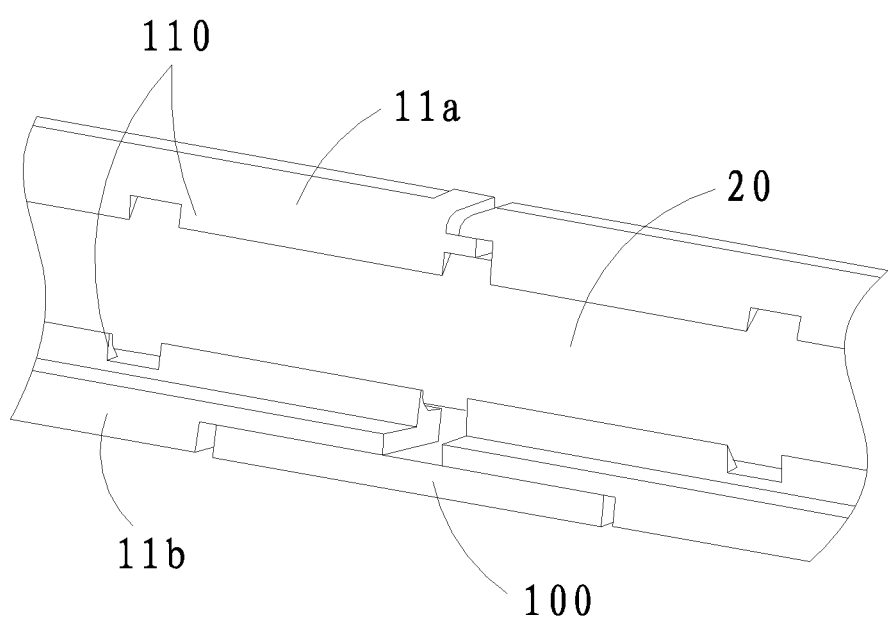
FIG. 5 is a partial schematic view of another portion of the backlight source assembly in accordance with one embodiment.

As shown in FIG. 5, the edge-type backlight source assembly may include a shade block 100. When some of the LED lamp bars 30 is long enough, the connector 40 is not needed between two assembled sub-brackets 11. Under the circumstance, the shade block 100 attaches to the jointing portion of two adjacent sub-brackets 11. Specifically, the shade block 100 is completely received within the space defined by two adjacent step portions 1. This configuration may further decrease the overall width of the QD tube bracket 10. In an example, the shade block 100 may be made by white rubber. The shade block 100 may effectively block the blue light emitted by the LED lamp bars 30.

The edge-type backlight source assembly may be incorporated in a variety of backlight module by configuring the QD tube 20 to face toward the light-incident side of the light guiding plate. The NTSC may be over 100% by adopting the combination of the blue LED and the QD tube 20, and the display performance may be effectively enhanced.

In view of the above, the QD tube bracket fixes the QD tube. The bases of the LED lamp bars attached to the bottom of the QD tube bracket such that the LED lamps are received within the QD tube bracket, and the LED lamps face toward the QD tubes. The connector, which is fixed on the sidewall of the QD tube bracket, electrically connects to the two adjacent LED lamps to ensure the wiring connection between the lamp bars. The wiring complexity is reduced, and thus may be easily implemented. The dimension of the QD tube bracket is decreased. This configuration realizes a compact backlight source assembly, the backlight module, the display device. At the same time, the connector is fixed in the jointing portion of the QD tube bracket. The welding foot are configured to be close to the LED lamps. The jointing portion of the QD tube brackets is provided with a receiving space for the connector. A bottom of the receiving space is configured with a notch to avoid the interference with the welding foot of the connector. This not only greatly decreases the width of the QD tube bracket, but also decreases the thickness of the backlight module.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An edge-type backlight source assembly, comprising:
at least one quantum bar (QD) tube bracket, at least one QD tube fixed within the QD tube bracket, a plurality of LED lamp bars, and a connector, the LED lamp bar comprises a substrate and a plurality of LED lamps on the substrate, the LED lamps emit blue light, the substrate is attached to a bottom of the QD tube bracket, the LED lamps are received within the QD tube bracket and are arranged to be opposite to the QD tube, the connector electrically connects with the adjacent two LED lamp bars and is fixed on a sidewall of the QD tube bracket;
wherein each of the sub-brackets comprises a first side plate and a second side plate spaced apart from each other, and a plurality of spacing bars spaced apart from each other, the spacing bars connect between the first side plate and the second side plate, a stopper protrusion is configured on internal walls of the first side plate and the second side plate, and the QD tube is clasped between the spacing bar and the stopper protrusion.

2. The edge-type backlight source assembly as claimed in claim 1, wherein the QD tube bracket comprises a plurality of sub-brackets assembled along a length direction.

3. The edge-type backlight source assembly as claimed in claim 2, wherein a shade block is configured to attach to a jointing portion of two adjacent sub-brackets when the connector is not arranged in the jointing portion of the two adjacent sub-brackets.

4. The edge-type backlight source assembly as claimed in claim 1, wherein a surface of the stopper protrusion faces toward the QD tube is arc-shaped.

5. The edge-type backlight source assembly as claimed in claim 1, wherein, for each of the two adjacent sub-brackets, an outer surface of an end portion of the second side plate recesses to form a step portion, and the connector is arranged within a space defined by two adjacent step portions.

6. The edge-type backlight source assembly as claimed in claim 1, wherein the second side plate is higher than the first side plate.

7. The edge-type backlight source assembly as claimed in claim 1, wherein the welding foots of the connector face toward the LED lamps, and the welding foots electrically connect with two adjacent LED lamp bars.

8. The edge-type backlight source assembly as claimed in claim 7, wherein the end portion of the second side plate, which is close to the bottom, comprises a notch for the welding foot to pass through.

9. A backlight module, comprising:
a light guiding plate and an edge-type backlight source assembly;
the edge-type backlight source assembly comprises at least one quantum bar (QD) tube bracket, at least one QD tube fixed within the QD tube bracket, a plurality of LED lamp bars, and a connector, the LED lamp bar comprises a substrate and a plurality of LED lamps on the substrate, the LED lamps emit blue light, the substrate is attached to a bottom of the QD tube bracket, the LED lamps are received within the QD tube bracket and are arranged to be opposite to the QD tube, the connector electrically connects with the adjacent two LED lamp bars and is fixed on a sidewall of the QD tube bracket; and
the QD tube is arranged in a light-incident side of the light guiding plate;
wherein each of the sub-brackets comprises a first side plate and a second side plate spaced apart from each other, and a plurality of spacing bars spaced apart from each other, the spacing bars connect between the first side plate and the second side plate, a stopper protrusion is configured on internal walls of the first side plate and the second side plate, and the QD tube is clasped between the spacing bar and the stopper protrusion.

10. The backlight module as claimed in claim 9, wherein the QD tube bracket comprises a plurality of sub-brackets assembled along a length direction.

11. The backlight module as claimed in claim 10, wherein a shade block is configured to attach to a jointing portion of two adjacent sub-brackets when the connector is not arranged in the jointing portion of the two adjacent sub-brackets.

12. The backlight module as claimed in claim 9, wherein a surface of the stopper protrusion faces toward the QD tube is arc-shaped.

13. The backlight module as claimed in claim 9, wherein, for each of the two adjacent sub-brackets, an outer surface of an end portion of the second side plate recesses to form a step portion, and the connector is arranged within a space defined by two adjacent step portions.

14. The backlight module as claimed in claim 9, wherein the second side plate is higher than the first side plate.

15. The backlight module as claimed in claim 9, wherein the welding foots of the connector face toward the LED lamps, and the welding foots electrically connect with two adjacent LED lamp bars.

16. The backlight module as claimed in claim 15, wherein the end portion of the second side plate, which is close to the bottom, comprises a notch for the welding foot to pass through.

17. A backlight module, comprising:
a light guiding plate and an edge-type backlight source assembly;
the edge-type backlight source assembly comprises at least one quantum bar (QD) tube bracket, at least one QD tube fixed within the QD tube bracket, a plurality of LED lamp bars, a connector, and a shade block, the LED lamp bar comprises a substrate and a plurality of LED lamps on the substrate, the LED lamps emit blue light, the substrate is attached to a bottom of the QD tube bracket, the LED lamps are received within the QD tube bracket and are arranged to be opposite to the QD tube, the connector electrically connects with the adjacent two LED lamp bars and is fixed on a sidewall of the QD tube bracket, the QD tube is arranged in a light-incident side of the light guiding plate, wherein a shade block is configured to attach to a jointing portion of two adjacent sub-brackets when the connector is not arranged in the jointing portion of the two adjacent sub-brackets;
wherein each of the sub-brackets comprises a first side plate and a second side plate spaced apart from each other, and a plurality of spacing bars spaced apart from each other, the spacing bars connect between the first side plate and the second side plate, a stopper protrusion is configured on internal walls of the first side plate and the second side plate, and the QD tube is clasped between the spacing bar and the stopper protrusion.

* * * * *